United States Patent
Regan

(10) Patent No.: US 7,301,479 B2
(45) Date of Patent: Nov. 27, 2007

(54) TRAILER DETECTION CIRCUIT FOR A VEHICLE PARK ASSIST SYSTEM

(75) Inventor: Patrick M Regan, Bloomfield Hills, MI (US)

(73) Assignee: Chrysler LLC, Auburn Hills, MI (US)

( * ) Notice: Subject to any disclaimer, the term of this patent is extended or adjusted under 35 U.S.C. 154(b) by 281 days.

(21) Appl. No.: 10/738,654

(22) Filed: Dec. 17, 2003

(65) Prior Publication Data

US 2005/0068197 A1    Mar. 31, 2005

Related U.S. Application Data

(60) Provisional application No. 60/506,903, filed on Sep. 26, 2003.

(51) Int. Cl.
*B60Q 1/48* (2006.01)
(52) U.S. Cl. .................. 340/932.2; 340/431
(58) Field of Classification Search ............ 340/932.2, 340/903, 937, 933, 431; 280/432, 656
See application file for complete search history.

(56) References Cited

U.S. PATENT DOCUMENTS

| | | | | |
|---|---|---|---|---|
| 3,734,539 A | * | 5/1973 | Salmi | .................. 280/477 |
| 5,434,552 A | * | 7/1995 | Ems | .................. 340/431 |
| 5,754,123 A | | 5/1998 | Nashif et al. | .............. 340/903 |
| 6,226,226 B1 | * | 5/2001 | Lill et al. | .................. 367/98 |
| 6,446,998 B1 | * | 9/2002 | Koenig et al. | .............. 280/432 |
| 6,476,730 B2 | | 11/2002 | Kakinami et al. | ....... 340/932.2 |
| 6,594,614 B2 | | 7/2003 | Studt et al. | .............. 702/150 |
| 6,788,190 B2 | * | 9/2004 | Bishop | .............. 340/435 |

* cited by examiner

*Primary Examiner*—Phung T. Nguyen
(74) *Attorney, Agent, or Firm*—Ralph E. Smith

(57) ABSTRACT

Vehicle park assist systems and a method of operating a vehicle including an operably attached trailer. The vehicle park assist system includes a transmitter arrangement to produce incident energy on an obstacle, and a sensor arrangement to detect reflected energy from the obstacle. A controller determines an obstacle status based on the reflected energy, and detects attachment of a trailer to the vehicle. A warning apparatus operably coupled to the controller indicates the obstacle status. The warning apparatus is regulated based on the attachment of the trailer to the vehicle. The method includes providing a vehicle park assist system, detecting the attachment of the trailer to the vehicle, and regulating the vehicle park assist system based on the attachment of the trailer to the vehicle.

14 Claims, 3 Drawing Sheets

TRAILER DETECTION CIRCUIT FOR A VEHICLE PARK ASSIST SYSTEM

RELATED APPLICATION(S)

This application claims the benefit of Provisional Application Ser. No. 60/506,903, filed Sep. 26, 2003.

TECHNICAL FIELD OF THE INVENTION

The present invention relates generally to rear park assist systems including vehicle obstacle detection. More particularly, the invention relates to a trailer detection circuit for a vehicle park assist system.

BACKGROUND OF THE INVENTION

Numerous strategies have been developed to assist vehicle operators during parking (e.g., reversing) maneuvers. Such vehicle park assist systems may include radar and/or ultrasonic emitters and sensors designed to alert the operator when object(s) are in vehicle's path. One or more visual and/or audio signals may alert the operator of an imminent collision so that appropriate countermeasures may be taken.

An example of a park assist system is a hybrid ultrasonic and radar backup aid disclosed in U.S. Pat. No. 5,754,123 issued to Nashif et al. on May 19, 1998. An apparatus according to the '123 patent includes ultrasonic sensors positioned at the rear of the vehicle providing continuous range information to a control module for objects that are detected as being relatively close to the vehicle. A radar system provides range information to the control module for objects detected beyond the range of the ultrasonic system. At low speeds below a predetermined minimum speed level or when the system is placed in the "park" mode for parking, the radar information is ignored and only the ultrasonic information is used to warn the vehicle operator. At a relatively high threshold backup speed, the vehicle operator is immediately warned to slow down, whether or not an object is detected in the vehicle path. Between the lower and upper threshold speeds, both the ultrasonic system and the radar system are used to continuously range and detect any objects that enter their respective detection fields. The control module causes an alarm device to warn the operator as to how close the vehicle is to the closest object.

Another example of a park assist system is one disclosed in U.S. Pat. No. 6,594,614 issued to Studt et al. on Jul. 15, 2003. A warning system according to the '614 patent scans behind the vehicle with an emitter/sensor system and determines a time-to-collision with the object based on distance to the object and vehicle speed. Based upon the time-to-collision, a simple combination of visual and audio signals is designed to let the operator known of the imminency of a collision with the object so that the operator may react and make appropriate countermeasures.

Other examples of vehicle park assist strategies include those disclosed by U.S. Pat. No. 6,446,998 issued to Koenig et al. on Sep. 10, 2002; U.S. Pat. No. 6,476,730 issued to Kakinami et al. on Nov. 5, 2002; and U.S. Pat. No. 5,754,123 issued to Adachi et al. on Aug. 28, 2001.

Although these and other strategies may provide effective assistance to vehicle operators during parking maneuvers, the use of attached vehicle trailers may interfere with the proper function of such warning systems. For example, a trailer attached to a rear portion of the vehicle may inappropriately and continuously activate visual and/or audio signals of an impending collision. To overcome this, vehicles may include a "switch" to deactivate the warning system. The use of a switch may increase the cost and complexity of the warning system and require the operator to manually de-activate and activate system. In some cases, the operator may de-activate the system and then forget to re-activate the system once the trailer is removed. What is needed, then, is a strategy for detecting the presence of a trailer thereby allowing for the automatic deactivation and activation of a park assist system.

Therefore, it would be desirable to provide a trailer detection circuit for a vehicle park assist system that overcomes the aforementioned and other disadvantages.

SUMMARY OF THE INVENTION

A first aspect of the present invention provides a vehicle park assist system. The system includes a transmitter arrangement to produce incident energy on an obstacle, and a sensor arrangement to detect reflected energy from the obstacle. A controller determines an obstacle status based on the reflected energy, and detects attachment of a trailer to the vehicle. A warning apparatus operably coupled to the controller indicates the obstacle status. The warning apparatus is regulated based on the attachment of the trailer to the vehicle.

A second aspect of the present invention provides a method of operating a vehicle including an operably attached trailer. The method includes providing a vehicle park assist system, detecting the attachment of the trailer to the vehicle, and regulating the vehicle park assist system based on the attachment of the trailer to the vehicle.

A third aspect of the present invention provides a vehicle park assist system. The system includes means for producing incident energy on an obstacle, means for detecting reflected energy from the obstacle, means for determining an obstacle status based on the reflected energy. The system further includes means for detecting attachment of a trailer to the vehicle, and means for indicating the obstacle status. The indicating means are regulated based on the attachment of the trailer to the vehicle.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DESCRIPTION OF THE PRESENTLY PREFERRED EMBODIMENTS

Figure 1:
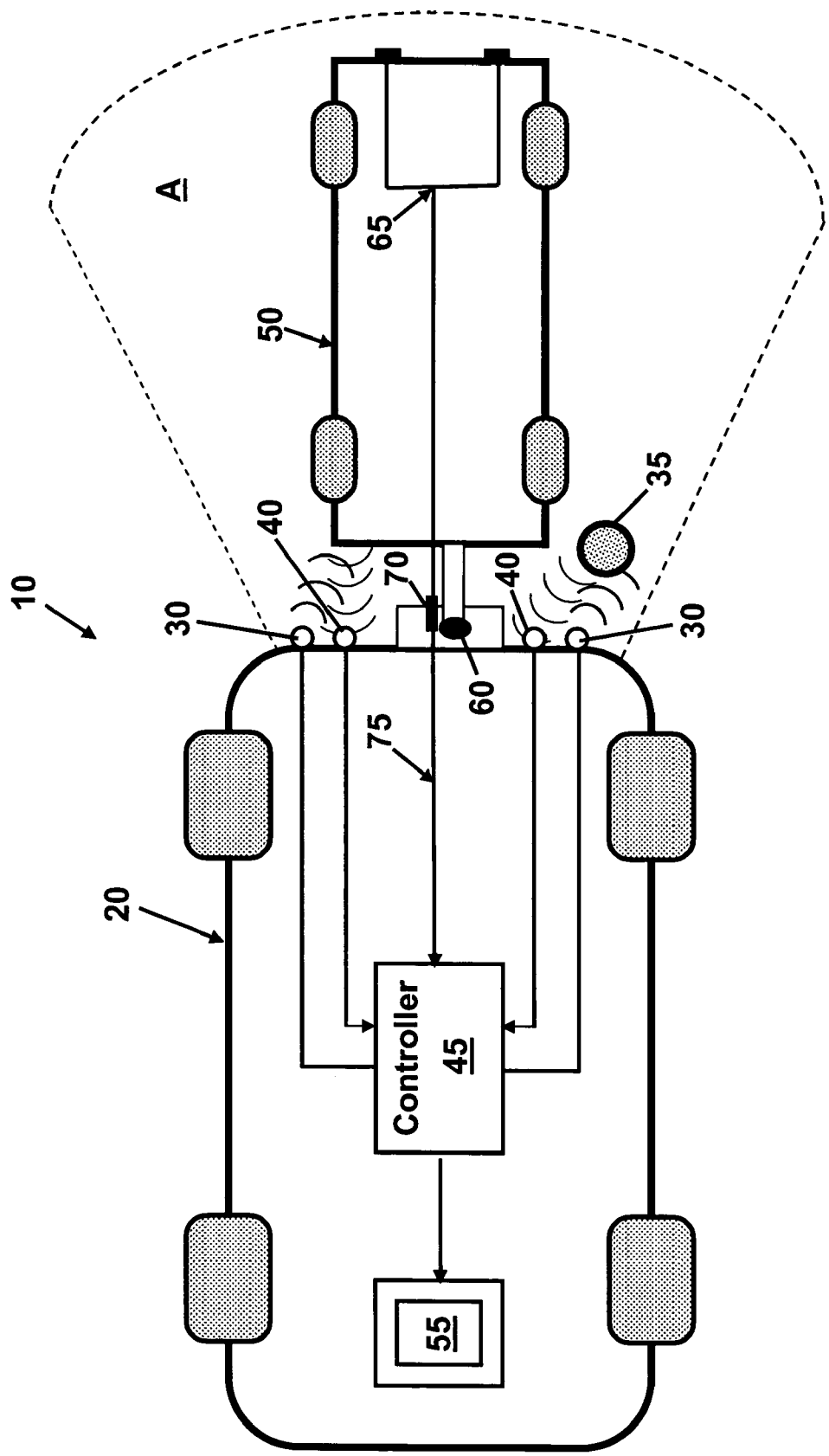
FIG. 1 is a schematic view of a vehicle park assist system in accordance with one embodiment of the present invention.

Referring to the drawings, wherein like reference numerals refer to like elements, FIG. 1 is schematic view of a park assist system in accordance with the present invention, the system shown generally by numeral 10. The park assist system 10 may be installed in a vehicle 20 wherein the system 10 may include a transmitter arrangement 30 to produce incident energy on an obstacle 35 and a sensor arrangement 40 to detect reflected energy from the obstacle 35. A controller 45 may be coupled (e.g., by wire(s) or radio frequency transmission) to control the transmitter and sensor arrangements 30, 40 and receive sensor arrangement 40 data. Controller 45 may also determine an obstacle 35 status based on the reflected energy and may detect attachment of a trailer 50 to the vehicle 20. A warning apparatus 55 coupled to the controller 45 indicates the obstacle status. In one embodiment, the obstacle status may be communicated to vehicle 20 operator with one or more audio, visual, and/or other sensory indications. As understood in the art, the obstacle status may comprise the presence of obstacles within a predetermined area or volume of space A external to the vehicle 20. In the present description, the obstacle 35 comprises an object of at least a minimal size and/or composition present in a generally "rear" direction to the vehicle 20.

Trailer 50 may be mechanically attached to the vehicle 20 via numerous attachment means, such as with a ball-and-hitch assembly 60. In one embodiment, the trailer 50 may include a trailer brake light system 65 with a harness 70 for electronic attachment to a vehicle lamp circuit 75. Commercially available trailers typically include trailer brake light systems and harnesses that do not require any modification for use with the present invention thereby reducing the overall cost and complexity of system 10 implementation. The coupling of the harness 70 to the vehicle lamp circuit 75 provides means for detecting attachment of the trailer 50 to the vehicle 20. For example, the controller 45 may periodically sample the vehicle lamp circuit 75 current and/or voltage level, which may change with trailer 50 attachment/detachment. In another embodiment, the controller 45 may sense trailer 50 attachment using a variety of other strategies. For example, the trailer 50 may include a radio transmitter (not shown) capable of sending one or more specific radiowave frequencies. When the trailer 50 is in proximity to the vehicle 20, the radiowave(s) may be detected by the controller 45 thereby indicating trailer 50 attachment.

Figure 2:
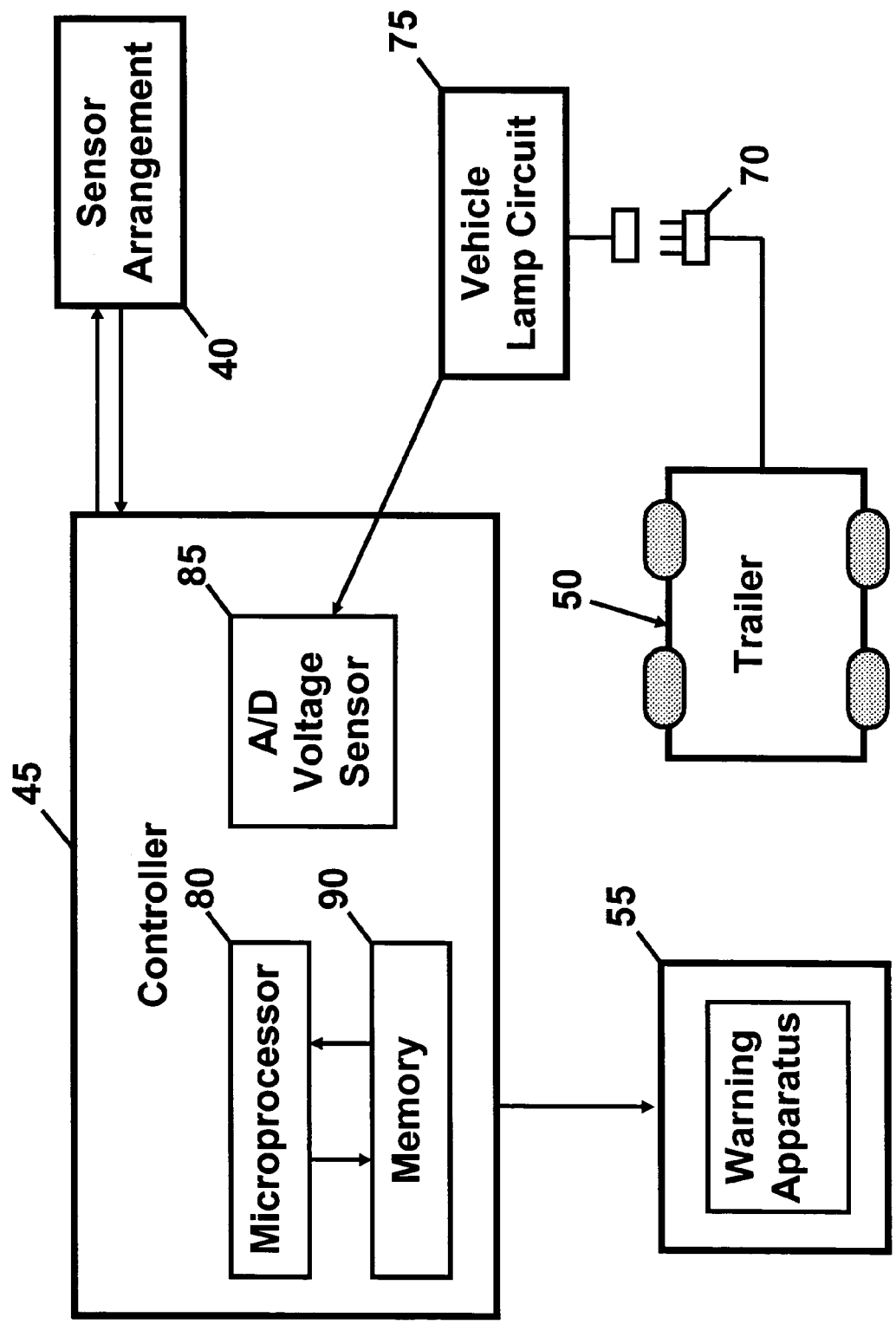
FIG. 2 is a schematic detailed of the vehicle park assist system of FIG. 1.

In one embodiment of the present invention, as shown in FIG. 2, the controller 45 may include a digital microprocessor 80 programmed to process a plurality of input signals (e.g., from the sensor arrangement 40 and vehicle lamp circuit 75 via an analog/digital voltage and/or current sensor(s) 85 built into the controller 45) in a stored algorithm and generate one or more output signals for controlling the warning apparatus 55. In one embodiment, warning apparatus 55 may communicate with the controller 45 with a CAN/J1850 serial data bus as known in the art. In another embodiment, the warning apparatus 55 may communicate with the controller 45 via numerous other data transfer strategies such as a parallel data bus or other communications link known in the art. The methods, algorithms, and determinations (e.g., calculations and estimations) of the present invention, including those based on equations or value tables, may be performed by a device such as the microprocessor 80. The algorithm, value tables, and input/output data associated with the invention may be programmed, read, and/or stored into a memory portion 90 (e.g., ROM, RAM, and the like). Microprocessor 80 may access the information stored in the memory portion 90 for providing a vehicle park assist function and determining attachment of the trailer 50 via the harness 70. Analog signal processing may be provided for some of the input signals. For example, the signals from the sensor arrangement 40 and the analog/digital voltage and/or current sensor(s) 85 may be low-pass filtered through analog low-pass filter(s) to reduce signal noise.

Referring again to FIG. 1, the park assist system 10 may be regulated based on the attachment of a trailer 50 to the vehicle 20. In one embodiment, the regulation comprises deactivating a portion of the system 10 when the trailer is attached to the vehicle 20 and activating a portion of the system 10 when the trailer 50 is detached from the vehicle 20. Specifically, a portion of the warning apparatus 55, such as the audio and/or visual alarm, may be deactivated/activated depending on trailer attachment/detachment. In another embodiment, the regulation may comprise deactivating, activation, or altering the function (i.e., changing function without total deactivation) of the warning apparatus 55 or another portion of the park assist system 10. For example, a visual indicator (e.g., an LED or an icon or message on a display system) may be activated upon attachment of the trailer 50 to the vehicle 20 thereby alerting the vehicle 20 operator. Those skilled in the art will appreciate that the type and extent of regulation may be dependent upon the type and features of the park assist system used.

Figure 3:
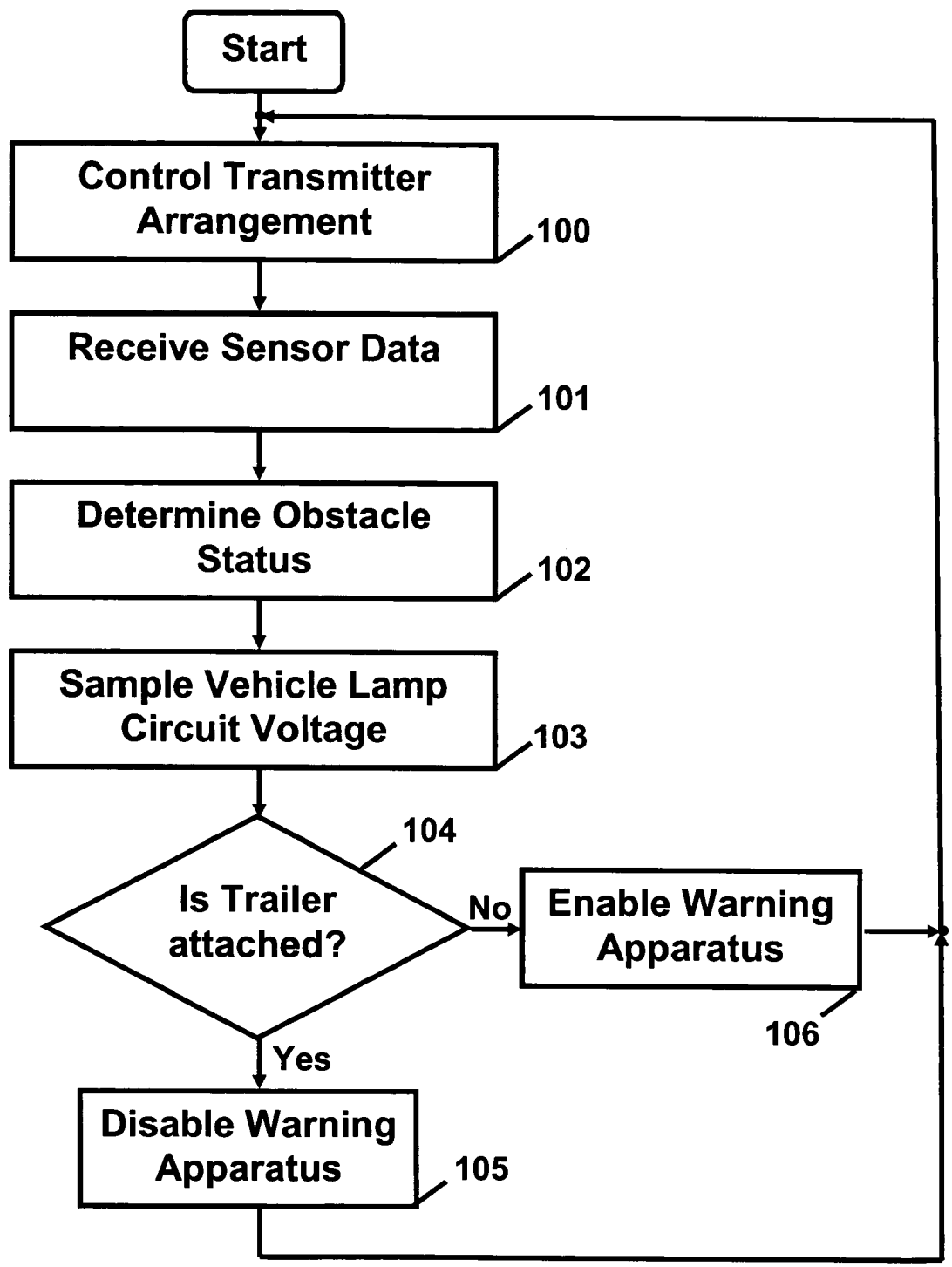
FIG. 3 is a flow diagram of an algorithm in accordance with one embodiment of the present invention for use in the vehicle park assist system of FIGS. 1 and 2.

FIG. 3 is a flow diagram of an algorithm in accordance with the present invention for use in the vehicle park assist system 10. Specifically, the algorithm may be implemented as a computer usable medium including a program run by the microprocessor 75. The algorithm may begin by controlling the transmitter arrangement 30 (step 100) and the sensor arrangement 40 (step 101), both known in the art. The obstacle status may then be determined (step 102), also known in the art. While the controller 45 operates the park assist function, the current and/or voltage level of the vehicle lamp circuit 70 may be periodically sampled (e.g., every second, every minute, and the like) via the voltage and/or current sensor(s) 80 (step 103). Sampled values may be compared to values pre-programmed as part of value tables or values stored in the memory portion 85 to determine differences that may be indicative of trailer 55 attachment/detachment (step 104).

If a trailer is attached, the warning apparatus 60 may be disabled (step 105). If trailer is not attached, the warning apparatus 60 may be enabled (step 106). Optionally, one or more triggers may regulate the warning apparatus 60. For example, a warning apparatus 60 may be automatically activated with a new ignition cycle to ensure that the active state is the default state. Once activated at vehicle 20 start-up, the controller 45 may quickly regulate (e.g., deactivate) the warning apparatus 60 should the trailer 55 be attached to the vehicle 20.

While the embodiments of the invention disclosed herein are presently considered to be preferred, various changes and modifications can be made without departing from the spirit and scope of the invention. The park assist system, vehicle, and trailer are not limited to any particular design or arrangement. For example, the transmitter and sensor arrangements, controller, warning system, vehicle lamp circuit, trailer brake light system, harness, voltage and current sensors, and ball-and-hitch assembly vehicle may vary without limiting the utility of the invention. Those skilled in the art will recognize that numerous park assist systems are known and may be adapted for use with the present invention. The foregoing embodiments are provided merely to illustrate a subset of many possible arrangements.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

The invention claimed is:

1. A vehicle park assist system comprising:
   a transmitter arrangement to produce incident energy on an obstacle;
   a sensor arrangement to detect reflected energy from the obstacle;
   a controller to determine presence of an obstacle based on the reflected energy, and to detect attachment of a trailer to the vehicle; and
   a warning apparatus operably coupled to the controller to indicate the presence of the obstacle; the controller disabling the warning apparatus whenever attachment of the trailer to the vehicle is detected.

2. The system of claim 1 wherein the energy is selected from a group consisting of ultrasonic energy and electromagnetic radiation.

3. The system of claim 1 wherein the controller activates the warning apparatus whenever the trailer is detached from the vehicle.

4. The system of claim 1 wherein the indication of the presence of the obstacle comprises at least one of an audio indication and a visual indication.

5. The system of claim 1 wherein detecting attachment of the trailer to the vehicle comprises detecting at least one of a change in a trailer circuit current, a change in a trailer circuit voltage, and detection of a radio frequency.

6. The system of claim 1 wherein attachment of the trailer to the vehicle comprises connection of a trailer harness to a trailer circuit.

7. The system of claim 1 further comprising a trailer indicator to indicate status of the trailer attachment.

8. A method of providing a vehicle park assist system, the method comprising:
   detecting attachment of a trailer to the vehicle;
   activating the vehicle park assist system whenever attachment of the trailer to the vehicle is not detected; and
   deactivating the vehicle park assist system whenever attachment of the trailer is detected.

9. The method of claim 8 wherein detecting the attachment of the trailer to the vehicle comprises detecting a change in a trailer circuit voltage.

10. The method of claim 8 wherein detecting the attachment of the trailer to the vehicle comprises detecting a change in a trailer circuit current.

11. The method of claim 8 wherein detecting the attachment of the trailer to the vehicle comprises connecting a trailer harness to a trailer circuit.

12. The method of claim 8 futher comprising indicating status of the trailer attachment.

13. A method of providing a vehicle park assist system, the method comprising:
   detecting the attachment of a trailer to the vehicle by detecting a radio frequency;
   activating the vehicle park assist system whenever attachment of the trailer to the vehicle is not detected; and
   deactivating the vehicle park assist system whenever attachment of the trailer is detected.

14. A vehicle park assist system comprising:
   a sensor arrangement to detect reflected energy from the obstacle;
   a vehicle lamp circuit that communicates with a trailer;
   a controller to determine presence of an obstacle based on the reflected energy, and to detect attachment of said trailer to the vehicle based on periodic samples of at least one of a voltage level and a current level of said vehicle lamp circuit; and
   a warning apparatus operably coupled to the controller to indicate the presence of the obstacle; the controller disabling the warning apparatus whenever attachment of the trailer to the vehicle is detected.

* * * * *